Feb. 5, 1952     D. L. SANZENBACHER     2,584,295

CULINARY ACCESSORY

Filed Sept. 17, 1949

INVENTOR.
Donald L. Sanzenbacher
BY Wm. O. Ballard
his attorney

Patented Feb. 5, 1952

2,584,295

UNITED STATES PATENT OFFICE 2,584,295

CULINARY ACCESSORY

Donald L. Sanzenbacher, Toledo, Ohio

Application September 17, 1949, Serial No. 116,297

4 Claims. (Cl. 99—419)

This invention relates to a culinary accessory particularly adapted to mount a food item such as a cut of meat, a fish, or a fowl, during the cooking process and thereafter while the food is sub-divided.

An object of this invention is to provide a rack-like support upon which a food item may be impaled to be supported in a desirable cooking position and also be supported during subsequent cutting.

Another object of this invention is to provide a rack-like support which may have a plurality of impaling tines adjustable relatively to each other for adapting the support to the contour of the item to be mounted thereon and furthermore permit a folding of the accessory into a convenient form for storage.

And another object of this invention is to provide a rack-like accessory allowing ready maneuvering of the supported food item, yet automatically gripping its supporting surface when pressure is applied to the food as in a cutting operation.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings.

Figure 1:
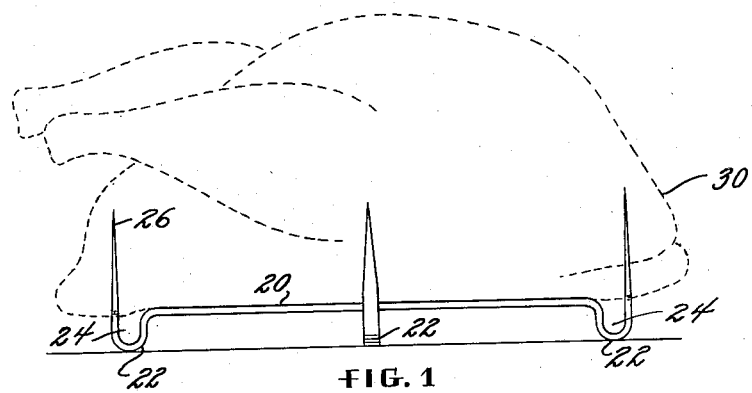
Fig. 1 is a side elevation of a preferred form of the device in position to support a food item for cooking or preparation for the table (a representative food item, such as a fowl, being indicated by dotted lines)
Figure 3:
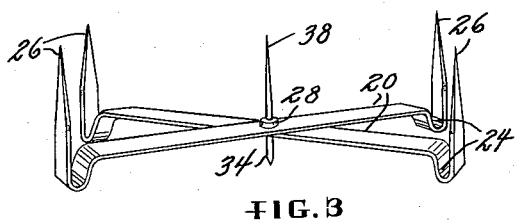
Fig. 3 is a perspective view of the device of Fig. 1 in partially closed or folded position.
Figure 2:
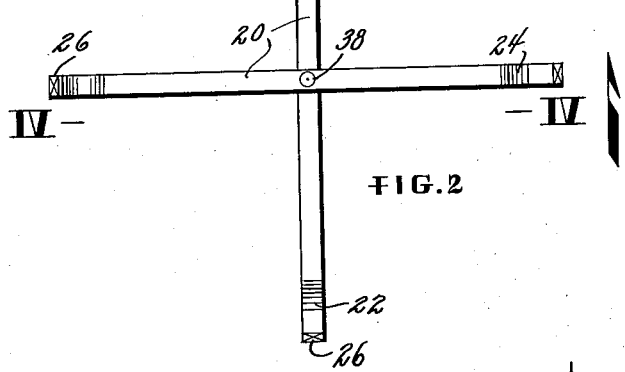
Fig. 2 is a plan view of the device of Fig. 1.
Figure 4:
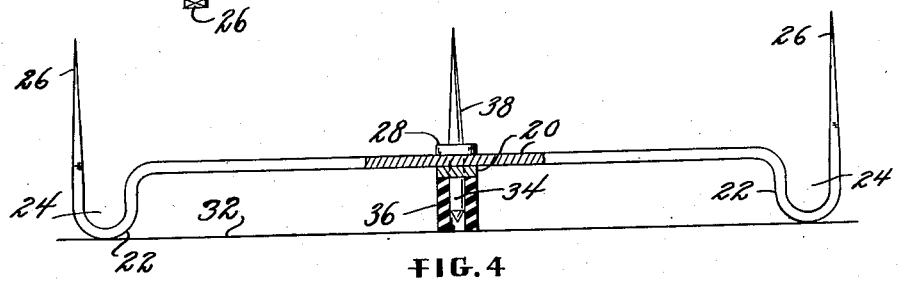
Fig. 4 is a view on the line IV—IV, Fig. 2.

The device comprises a pair of like major parts formed from lengths of strip materials such as wire, rods, tape-shaped stock or the like and for purposes of illustration, a preferred form is herein shown as constructed from ribbons of stainless steel.

Each major part comprises a central extent 20 connecting a pair of spaced reverse bends 22 having bow portions and terminal tines 26. The two parts are intermediately connected by a rivet-like element 28 centrally of their lengths. This element 28 provides a pivot connection about which the strips may be laterally swung to thereby relatively adjust the tines 26. This adjustment permits the device to be opened or unfolded to distribute the tines according to the shape of the food item 30 to be impaled thereon for the most efficient support of the item and also permits folding of the device to provide a compact unit for storage when not in use and for packing for sales purposes.

The outermost extent of the bow portions 24 are in a common plane providing feet or supports for the rack-like device. The connected central portions of the major parts define a platform area with the tines 26 extending sufficiently therebeyond from the plane of support, to provide effective impalement of the food.

The material from which the two major parts are fabricated should preferably have an inherent flexibility which will impart a substantial give or spring to the device, at least in the bow regions. This allows a spread between the points of support whenever pressure is applied to the impaled food, as during a cutting action thereon, such as trimming, carving or slicing. This spreading tends to cause the device to more firmly grip its supporting surface 32 and thereby reduce any tendency to skid or slide.

Means may be incorporated to further reduce any tendency to skid. The rivet-like element 28 may be provided with a depending spike or tine 34 which terminates just short of the plane of support 32, when the device is standing alone. When pressure is applied to the item 30, this tine will engage the supporting surface and if such be a cutting-board or the like, will effectively bite thereinto for a positive anchoring of the device. Wherein the support to receive the carrier is likely to be a vitreous surface, such as chinaware, a compressible and flexible sheath 36 may be placed about the member 34, extending slightly therebeyond to serve as an anti-skid device.

If desired, a fifth tine 38 may be added to the element 28 to extend upwardly therefrom for cooperation with the other four impaling tines 26.

All the parts with the exception of the removable piece 34 can be of stainless steel, so the rack can receive the food prior to cooking and carry the same through the cooking operation as well as the serving thereof. Even the part 34 can be of such suitable material, as certain synthetic plastics, which would allow it to be used throughout the employment of the rack including cooking.

Figure 5:
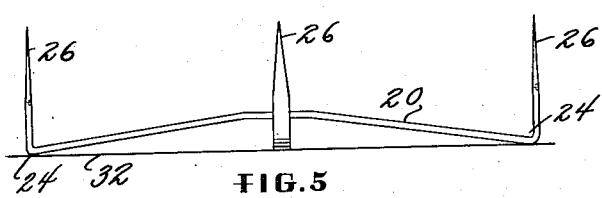
Fig. 5 is a side view of a modified form of the device.

The major parts may be variously configured as shown by an example illustrated in Fig. 5, wherein the platform area tapers downwardly from the central region directly to the bows or supporting points. Certain food items may be better handled by this form of the carrier.

By use of this device, circulation of the cooking mediums about the food item is increased and handling of the food is simplified as well as the ultimate serving.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and is desired to be secured by United States Letters Patent:

1. A culinary accessory comprising a pair of relatively flexible intermediately connected ribbons, said ribbons extending from said connection in opposite directions and provided with support-forming bent portions terminating in tines, said intermediate connection comprising a pin providing a pivotal joint with a spike extension therefrom toward the bows formed by said bent portions but terminating short of the plane passing through the outermost extent of said bows, and a flexible tubular sheath for said spike having a portion thereof extending beyond the spike to provide a free extension for engaging the surface supporting said accessory as an anti-skid device for the accessory.

2. In a culinary article of the class described, said article consisting of a pair of ribbon-like spring elements centrally pivoted together to form an adjustable cross-shaped device having four arms outwardly extending in diverse directions from the pivot connection in a substantially common plane and thence through reverse bend portions to terminate in tines with the reverse bends on one side of said plane and the terminal points of said tines on the opposite side of said plane.

3. The structure set forth in claim 2 wherein said tines taper outwardly from their terminal points through said plane to the reverse bend portions.

4. In an article of manufacture, a roast rack consisting of two ribbon-like spring metal elements centrally apertured, a rivet-like element extending through said apertures to pivotally connect said elements together so that each of said elements provide a pair of arms extending in opposite directions from said pivotal connection thereby to provide four arms in substantially the same plane forming a platform about the connecting element, said arms each having a reverse bend from their platform forming portions, said reverse bends terminating in tines upwardly extending from said platform, said reverse bends being on one side of the plane of the platform and said tines extending beyond the opposite side of said plane and tapered from their terminal points outwardly toward the reverse bends for a distance at least to the plane of the platform.

DONALD L. SANZENBACHER.

REFERENCES CITED

The following references are of record in the file of this patent:

UNITED STATES PATENTS

| Number | Name | Date |
| --- | --- | --- |
| 363,519 | Houston | May 24, 1887 |
| 436,654 | Frederick | Sept. 16, 1890 |
| 526,135 | Stone | Sept. 18, 1894 |
| 566,479 | Sellman | Aug. 25, 1896 |
| 691,833 | Williamson | Jan. 28, 1902 |
| 894,511 | Linderman | July 28, 1908 |
| 925,443 | Amberg | June 22, 1909 |
| 1,599,321 | Devlin | Sept. 7, 1926 |
| 1,969,601 | Foch | Aug. 7, 1934 |
| 2,183,938 | Lewis | Dec. 19, 1939 |
| 2,467,611 | Cook | Apr. 19, 1949 |

FOREIGN PATENTS

| Number | Country | Date |
| --- | --- | --- |
| 18,494 | Great Britain | Oct. 3, 1893 |
| 270,118 | Great Britain | May 5, 1927 |
| 401,374 | Great Britain | Nov. 16, 1933 |